United States Patent [19]

Hyuga et al.

[11] Patent Number: 5,039,637

[45] Date of Patent: Aug. 13, 1991

[54] PROCESS FOR PRODUCING A DIELECTRIC CERAMIC

[75] Inventors: Takehiro Hyuga, Ichikawa; Kazutoshi Matsumoto; Tetsuya Mukai, both of Matsudo, all of Japan

[73] Assignee: Sumitomo Metal Mining Co., Ltd., Tokyo, Japan

[21] Appl. No.: 536,520

[22] Filed: Jun. 12, 1990

Related U.S. Application Data

[63] Continuation-in-part of Ser. No. 436,652, Nov. 15, 1989.

[30] Foreign Application Priority Data

Nov. 16, 1988 [JP] Japan ................................ 63-287821
May 30, 1989 [JP] Japan ................................ 1-136677

[51] Int. Cl.$^5$ ............................................. C04B 35/46
[52] U.S. Cl. .................................... 501/135; 501/134; 501/136; 264/66
[58] Field of Search ............... 501/134, 135, 136, 137, 501/138, 139; 264/66

[56] References Cited

U.S. PATENT DOCUMENTS

| 4,121,941 | 10/1978 | Kawashima et al. | 106/39.5 |
| 4,148,853 | 4/1979 | Schuber | 264/66 |
| 4,264,548 | 4/1981 | Ezis | 264/66 |
| 4,477,401 | 10/1984 | Hagemann et al. | 264/61 |
| 4,487,842 | 12/1984 | Nomura et al. | 501/135 |
| 4,626,396 | 12/1986 | Wada et al. | 264/66 |
| 4,897,374 | 1/1990 | Matsumoto et al. | 501/134 |
| 4,918,035 | 4/1990 | Inoue et al. | 501/134 |

FOREIGN PATENT DOCUMENTS 0076011 4/1983 European Pat. Off. .
2166431 5/1986 United Kingdom .

Primary Examiner—William R. Dixon, Jr.
Assistant Examiner—Sue Hollenbeck
Attorney, Agent, or Firm—Foley & Lardner

[57] ABSTRACT

A process for producing a dielectric ceramic comprising a firing step comprises the substeps of heating a calcined product rapidly up to a temperature of from 1,500° to 1,700° C. and thereafter sintering the product at the temperature, and heating the product thus heat-treated through said first heat-treating substep at about 1,200° C. to 1,600° C. for not less than 10 minutes. It is possible to prepare a dielectric ceramic with a desired temperature properties of the resonant frequency.

13 Claims, 1 Drawing Sheet

PROCESS FOR PRODUCING A DIELECTRIC CERAMIC

CROSS REFERENCE TO RELATED APPLICATION

This is a continuation-in-part application of patent application Ser. No. 07/436,652 filed on Nov. 15, 1989.

BACKGROUND OF THE INVENTION

1. Field of the Invention

The present invention relates to a process for producing a dielectric ceramic, and in particular to a process for producing a dielectric ceramic having a desired temperature property of resonant frequency, without change in the composition, and suited to use for high frequency.

2. Description of the Prior Art

Temperature property of resonant frequency of dielectric ceramics (which may be hereinafter called merely "temperature property of dielectric ceramics") is generally controlled by changing the composition thereof, that is, changing the kinds or contents of constituent elements thereof. In particular, dielectric ceramics used in the micro wave band are required to have a high relative dielectric constant and unloaded Q and a good resonant frequency temperature property. The dielectric ceramics with a composition that satisfy such requirements include for example ceramics of a Ba(Zn Ni)$_{166}$(Ta,Nb)$_{170}$O$_3$ system having a perovskite-type complex structure.

In the ceramic of the above composition, a part of Zn ions are replaced with Ni ions for improvement in the temperature property. This replacement acts so as to reduce the relative dielectric constant and unloaded Q. In order to compensate these reduction, Ta ions are partially replaced with Nb ions in attempt to improve the relative dielectric constant. However, this results in deterioration of the temperature property and unloaded Q. As described above, only change in composition can not improve all of the properties required. In addition, it causes the problem that the production unit used needs to be cleaned thoroughly before production, every time the composition is changed.

The U.S. Pat. No. 4,487,842 of Nomura et al. discloses a process comprising the steps of adding a small amount from 0.5 to 5 mol % of Mn to a perovskite type structure compound oxide powder consisting of at least one member selected from the group consisting of Ba(Zn$_{166}$Ta$_{170}$)O$_3$ and Ba(Mg$_{166}$Ta$_{170}$)O$_3$, followed by calcination, and then sintering the Mn-treated oxide powder at 1,550°–1,600° C. In this process, to control the temperature property of the dielectric ceramic to be obtained, the composition of the ceramic must be changed. Further, the process is disadvantageous in that Mn which is added to promote sintering to produce a dense ceramic in the process is a element that does not constitute a perovskite structure, so that it may lower the dielectric properties of the dielectric ceramic obtained, and that the addition of Mn makes process control complicated.

The U.S. Pat. No. 4,121,941 of Kawashima et al. discloses, e.g., a method of making a low microwave loss ceramic of the formula:

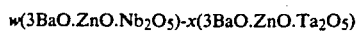

wherein $0.01 \leq w \leq 0.99$, $0.01 \leq x \leq 0.99$, and $w+x=1$, in solid solution, said method comprising the steps: calcining a mixture of the oxides or the like of the metals to be contained in the ceramic, and hot-pressing at a pressure of at least 50 kg/cm$^2$, at 1,100° C. to 1,450° C. for at least 30 minutes. To regulate the temperature property of the ceramic to be obtained in this method, the composition of the ceramic must be changed. This method does not needs the addition of Mn but requires hot-pressing to obtain a dense ceramic. The hot-pressing is disadvantageous in that it requires a special unit, that it is not suitable for mass production, and that it requires demolding operation after sintering which makes the manufacturing process complicated.

SUMMARY OF THE INVENTION

Accordingly, an object of the present invention is to solve the above problems, and to thereby provide a process for producing a dielectric ceramic having good relative dielectric constant and unloaded Q and capable of controlling the temperature property of resonant frequency of the ceramic to be obtained without change in composition of the ceramic.

The present inventors have discovered that the above object can be achieved by employment of a special firing step described below in a process for producing a dielectric ceramic having a perovskite complex crystal structure with a particular composition. That is, the firing step comprises the substeps of:

a first heat-treating substep comprising heating a calcined product conventionally obtained up to a temperature of from 1,500° to 1,700° C. at a rate of from 100° to 1,600° C./min. and thereafter maintaining the product at the temperature for not less than one minute, and a second heat-treating substep comprising maintaining the product thus produced through said first heat-treating substep at a temperature of at least 1,200° C. and lower than 1,500° C. or a temperature of from 1,200° to 1,600° C. according to the composition of the ceramic for not less than 10 minutes.

Further, the present inventors have discovered that addition of fluorine in the ceramic enables sintering to be promoted, and improves the dielectric properties such as dielectric constant and unloaded Q of the ceramic obtained.

According to the process of the present invention, it is possible to prepare a dielectric ceramic having a desired the temperature property of a dielectric ceramic by changing only the conditions of heat treatment but without changing the composition of the ceramic. It is also possible to prepare a dielectric ceramic with a high sintered density without addition of Mn or use of hot-pressing method. Moreover, as a secondary effect, it is possible to improve the unloaded Q of the dielectric ceramic.

DETAILED DESCRIPTION OF PREFERRED EMBODIMENTS

Figure 1:
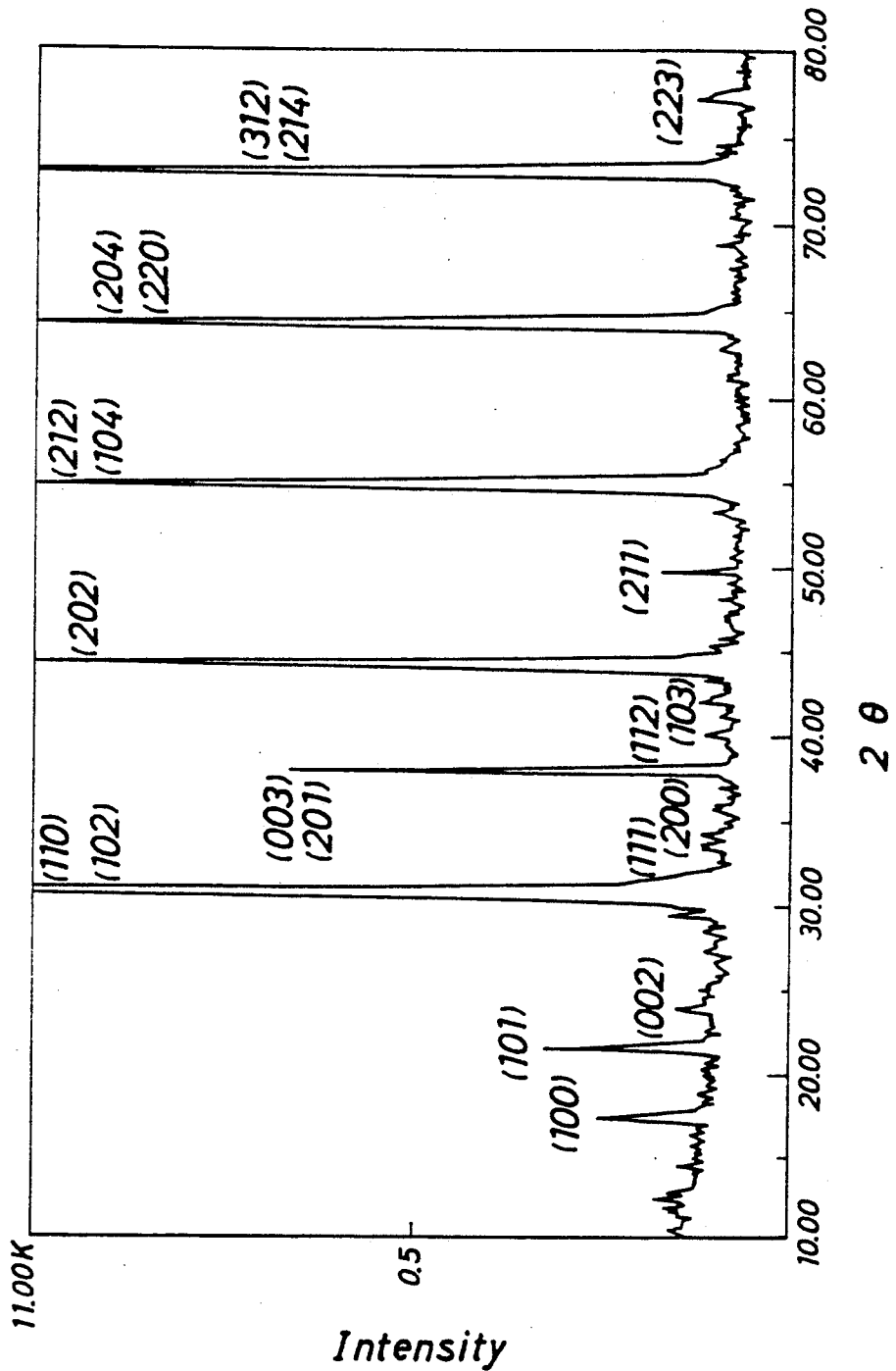
FIG. 1 shows a diffraction pattern of one of the dielectric ceramics produced by the process of the present invention.

The terminology, a ceramic essentially consisting of a compound having a perovskite-type complex crystal structure, means that if a trace amount of a second phase other than the compound of a perovskite-type complex crystal structure is found in a ceramic by X-ray diffractometry, the ceramic is considered to be included.

First Aspect of the Process

According to the first aspect of the present invention, there is provided a process for preparing a dielectric ceramic essentially consisting of a compound having a perovskite-type complex crystal structure and having a composition represented by the general formula (I):

$$Ba_xA_yB_{1-x-y}O_w \qquad (I)$$

wherein A represents at least one element selected from the group consisting of Mg, Zn, Ni and Co; B represents at least one element selected from the group consisting of Ta and Nb; x and y are numbers represented by $0.48 \leq x \leq 0.52$, and $0.15 \leq y \leq 0.19$, respectively; and w represents such a number as to neutralize the total electric charge of the cations of Ba, A and B so that said ceramic may become electrically neutral as a whole, said process comprising the steps of calcining a mixture of compounds selected from oxides of the metals constituting the compound of the general formula (I) and compounds thereof which are converted into the oxides under the conditions of this calcining step or the firing step below, at a temperature of from 900° to 1,400° C., and firing the calcined product obtained, wherein said firing step comprises:

a first heat-treating substep comprising heating said calcined product up to a temperature of from 1,500° to 1,700° C. at a rate of from 100° to 1,600° C./min. and thereafter maintaining the product at the temperature for not less than one minute, and a second heat-treating substep comprising heating the product thus produced through said first heat-treating substep at a temperature of 1,200° C. or higher and lower than 1,500° C. for not less than 10 minutes.

In the general formula (I), x is a number of $0.48 \leq x \leq 0.52$, preferably $0.49 \leq x \leq 0.51$; and y is a number of $0.15 \leq y \leq 0.19$, preferably $0.16 \leq y \leq 0.18$. The w represents a number such that the total electric charge of the cations of Ba, A and B is neutralized and said ceramic thereby become electrically neutral as a whole. The value of w will be automatically fixed if the values of x and y, and optionally the valence of Co, if Co is contained, are fixed. The w is normally a number of from 1.49 to 1.51.

The starting materials which may be used in the first aspect include the oxide of the metals contained in the compound of the general formula (I) and all the compounds of the metals which can be converted into the oxides under the conditions of the calcining or firing step. Typical examples of such compounds include the oxides, hydroxides, carbonates and alkoxides of the metals.

Specifically, the starting materials for the metals include, for example, barium carbonate, magnesium oxide, zinc oxide, nickel oxide, cobalt oxide, tantalum oxides such as tantalum pentaoxide, and niobium oxides such as niobium pentaoxide.

It is satisfactory that the ceramic of the general formula (I) described above has a composition substantially represented by the general formula (I); therefore, for example, the ceramic may contain fluorine in such an amount as to correspond to $z < 0.00025$ in the general formula (II) described below.

In the above process of the first aspect, normally, the powders of necessary starting materials are mixed in the amounts that can give the dielectric ceramic with a desired composition represented by the general formula (I), and the resulting mixture is subjected to calcination.

The calcination is carried out normally at from 900° to 1,400° C., preferably from 1,000° to 1,200° C. The calcined product is then ground, graded and press-molded, if required, and is subjected to firing. The firing step comprises the first heat-treating substep and the second heat-treating substep, as described above.

In the first heat-treating substep, temperature for firing is rapidly raised. Heating needs to be carried out at a rate of from 100° to 1,600° C./min., preferably from 300° C. to 1,600° C./min. If the heating rate is less than 100° C./min., the ceramic obtained has an insufficient sintered density. If the heating rate is over 1,600° C./min., the ceramic gets brittle. After the temperature is raised rapidly, the calcined product is maintained at a temperature of from 1,500° to 1,700° C., preferably from 1,550° C. to 1,650° C. If the temperature is less than 1,500° C., the sintered density of the dielectric ceramic does not increase sufficiently. If the temperature is over 1,700° C. on the other hand, the ceramic obtained is liable to get brittle. The calcined product is maintained at the temperature, after the rapid raising of temperature, for one minute or more, preferably for from 2 minutes to 4 hours. Where the calcined product is maintained at a higher temperature, a shorter time is enough; whereas where at a lower temperature, a longer time is needed.

The first heat-treating substep mainly serves to promote sintering and to thereby form a dense ceramic, but yet this substep eliminates the necessity of using sintering aids such as Mn which affects adversely the dielectric properties of the ceramic obtained and the necessity of complicated operation and a special sintering unit as required in hot-pressing. Moreover, this first heat-treating substep is also advantageous in that it is possible to obtain a ceramic with a high sintered density by a short time heat-treatment, for example, heat-treatment for 1 to 5 minutes, if conditions are selected appropriately.

The first heat-treating substep may be continuously followed by the next substep, i.e., the second heat-treating substep. Alternatively, after the first heat-treating substep, the heat-treated product may be cooled to room temperature once, and thereafter it may be subjected to the second heat-treating substep.

In the second heat-treating substep, firing is carried out at a temperature of 1,200° C. or higher and less than 1,500° C., preferably 1,400° C. or higher and less than 1,500° C. The firing time of 10 minutes or more is enough. Normally, the heat-treated product is fired for from 10 to 50 hours. If the firing temperature is lower than 1,200° C., the temperature property ($\tau_f$) of the ceramic obtained are not improved sufficiently; whereas if the firing temperature is too high, components may vigorously evaporates, so that change in the composition is liable to occur. In the case where the product heat-treated in the first heat-treating substep is cooled to room temperature once and is then heated up to a given temperature so that the second heat-treating substep may be carried out, a heating rate therefor is not limited.

The second heat-treating substep mainly serves to change the temperature property of the resonant frequency ($\tau_f$). That is, the controlling of the firing temperature and time in the second heat-treating substep makes it possible to regulate the temperature property of resonant frequency, although the composition of the ceramic is unchanged.

There is no limitation on the sort of atmosphere in which the two heat-treating substeps are carried out; any of oxidizing atmospheres such as air and oxygen and inert atmospheres such as nitrogen may be used. Also, there may be added aids for promoting sintering such as lithium, or a slight amount of metallic elements such as antimony, zirconium, titanium and vanadium or anions such as chlorine as elements for replacement.

Second Aspect of the Process

According to the second aspect of the present invention, there is provided a process for preparing a dielectric ceramic essentially consisting of a compound having a perovskite-type complex crystal structure and having a composition represented by the general formula (II):

$$Ba_xA_yB_{1-x-y}F_zO_w \qquad (II)$$

wherein A, B, x and y are the same as defined in respect of said general formula (I), z is a number of $0.00025 \leq z \leq 0.05$, and w represents such a number as to neutralize the total electric charge of the cations of Ba, A and B and the anions of F so that said ceramic may become electrically neutral as a whole, said process comprising the steps of calcining a mixture of compounds selected from oxides, fluoride and oxyfluorides of the metals constituting the compound of the general formula (II) and compounds thereof which are converted into the oxides, fluorides or oxyfluorides under the conditions of this calcining step or the firing step below, at a temperature of from 900° to 1,400° C., and firing the calcined product obtained, wherein said firing step comprises:

a first heat-treating substep comprising heating said calcined product up to a temperature of from 1,500° to 1,700° C. at a rate of from 100° to 1,600° C./min. and thereafter maintaining the product at the temperature for not less than one minute, and a second heat-treating substep comprising heating the product thus heat-treated at said first heat-treating substep at a temperature of from 1,200° to 1,600° C. for not less than 10 minutes.

The values of x and y in the general formula (II) are also preferably a number in the range as described in respect of said general formula (I). The z is a number of $0.0025z \leq 0.05$, preferably a number of $0.0005 \leq z \leq 0.01$. The value of w is fixed automatically according to the values of x, y and z and, if Co is contained, the valence of the Co. The w is normally a number in the range of from 1.49 to 1.51.

A ceramic having the same composition as those obtained by the second aspect of the present process is disclosed in the U.S. Pat. No. 4,897,374 by part of the present inventors; however the present invention has made it possible to control the temperature property of the resonant frequency of the ceramic by selecting only the conditions in the second heat-treating substep but without changing the composition thereof.

The second aspect of the present invention is differentiated from the first aspect of the present invention and the known processes in that a fluorine-containing compound is used as a part of the starting materials, and is differentiated from the process disclosed in the U.S. Pat. No. 4,897,374 in that the firing step comprises the two heat-treating substeps as described above.

The fluorine used serves to promote sintering, and is effective in preparing a ceramic with a high sintered density; therefore, the fluorine is advantageous in that it achieves sintering in a shorter time in cooperation with the first heat-treating substep. Further, fluorine will replace oxygen and become an element constituting the perovskite-type crystal structure in the resulting ceramic unlike Mn; hence fluorine does not cause lowering of the dielectric properties. The process of the second aspect is also attended by the advantage that the sintered density improved by fluorine brings about improvement in the relative dielectric constant and unloaded Q of the ceramic.

The compounds which may be used as a source of fluorine include fluorides, double fluorides and oxyfluorides of the metal contained in the intended compound of the general formula (II), specifically including, e.g., fluorides such as barium fluoride, magnesium fluoride, zinc fluoride, cobalt fluoride and tantalum fluoride; oxyfluorides such as $TaOF_3$, $TaO_2F$ and $NbO_2F$; double fluorides such as $Ba_2MgF_6$, $Ba_2NiF_6$, $BaNiF_4$, $Ba_2CoF_6$ and $BaCoF_4$. Since the metallic ions in these compounds also become constituents of the ceramic obtained, compounds should be selected appropriately from these compounds according to the composition of an intended ceramic. Other compounds which may be used as a fluorine source include, for example, potassium fluoride, sodium fluoride and lithium fluoride.

As the compounds which may be used as sources of the metal constituents, i.e., Mg, Zn, Ni, Co, Ta and Nb, the compounds described in respect of the first aspect of the present invention can be used. Using the above fluoride of barium, magnesium or tantalum or the above double fluorides as the source of a metal constituent makes it hard for metallic impurities to be incorporated from starting materials into the dielectric ceramic, and hence is preferable from viewpoint of quality control.

The mixture of starting materials selected according to an intended composition is first calcined. The calcination is carried out in the same matter as in the case of the first aspect described above. The calcined product thus obtained is ground, graded and press-molded, if necessary, according to conventional methods, and thereafter is subjected to sintering.

The firing step in the second aspect of the present process comprises the first heat-treating substep and the second heat-treating substep, the functions and effects of which are the same as in the case of the first aspect of the present process. That is, the first heat-treating substep mainly serves to sinter the calcined product, and the second heating-substep mainly serves to control the temperature properties of the ceramic to be obtained. The first and second heat-treating substeps are carried out in the same manner as in the case of the first aspect described above, except that the firing in the second heating-substep is carried out at a temperature of from 1,200° to 1,600° C., preferably from 1,400° to 1500° C.

When a dielectric ceramic with a perovskite-type complex crystal structure represented by the general formula (I) or the general formula (II) is produced according to the process of the present invention, powdery starting materials of constituents may be weighed depending on a desired composition, blended at a desired proportion and dried, and then the materials may be subjected to the process of the present invention. The amounts of individual starting materials should be set with consideration of easiness or difficulty in volatilization evaporation of the individual constituents, as performed conventionally. For example, in the above calcining and firing steps, it may occur that part of fluorine in the starting materials is volatilized by heating. Hence, the amount of fluorine in the starting materials must be determined in anticipation of the amount of the fluorine to be volatilized by heating. As methods of suppressing this volatilization, however, there may be used, for example, a method in which a starting material mixture is enveloped by a fire resistant materials such as MgO, $ZrO_2$ or $Al_2O_3$, or a method in which powder of $BaF_2$, $MgF_2$ or the like is placed in a hermetically closed, fire resistant vessel for carrying out the calcination and firing, or the calcination and firing of starting materials are carried out using a vessel comprised of fluorides such as fluorite. This suppressing of the volatilization of fluorine is effective particularly when dielectric ceramics containing fluorine in an amount near to the lower limit in general formula (II) (i.e., where z is 0.00025) are prepared.

The dielectric ceramic used for high frequencies is generally required to have a relative dielectric constant of 24 or more and an unloaded Q of 6,000 or more. These requirements are met by said ceramics of the general formula (I) or (II) produced by the process of the present invention. Moreover, the temperature coefficient of the resonant frequency can be controlled by regulating the conditions of the heat-treatment.

Control of Temperature Properties

According to the present process, the temperature property of the resonant frequency of the dielectric ceramic is controlled by converting the crystal structure of the ceramic from a disordered state to an ordered state in the second heating-substep, as described below.

(A) In the case where a ceramic to be prepared has order-disorder transition temperature below 1,500° C. and the calcined product has been heat-treated at the first heat-treating substep for sufficiently long time, i.e., normally more than about 30 minutes, the ceramic obtained after the first heat-treating substep has a disordered structure having the largest temperature coefficient ($\tau_f$). The heat treatment at a temperature of lower than 1500° C. at the second heat-treating substep will transform the crystal structure from a disordered state to an ordered state. The temperature coefficient decreases with the progress of the transformation. Accordingly, it is possible to control the temperature coefficient by selecting the temperature and length of time of heating at the second heating sub-step. In this case, heating in the second heat-treating substep is carried out at a temperature of 1,200° C. or higher and lower than 1,500° C.

(B) In the case where the calcined product has been heat-treated at the first heat-treating substep for a short time, i.e., normally about 30 minutes or less, the ceramic obtained after the first heat-treating substep has a disordered structure having the largest temperature coefficient ($\tau_f$) irrespective of order-disorder transition temperature because arrangement of atoms is insufficient yet.

The heat treatment in the second heating substep will decrease the degree of disorder more or less. In this case, heating in the second heat-treating substep may be within the range of from 1,200° to 1,600° C. in the case of the second aspect. The temperature coefficient decreases with the progress of the transformation. Accordingly, it is possible to control the temperature coefficient by selecting the temperature and the length of the time of the second heating sub-step.

EXAMPLES

From powders of barium carbonate, magnesium oxide, zinc oxide, nickel oxide, cobalt oxide, tantalum oxide, niobium oxide, barium fluoride and magnesium fluoride each having a purity of 99.9% by weight or more, necessary powders were selected, and blended to give Test Sample Nos. 1 to 51 which are classified to seven kinds of compositions shown in Table 1 (No. 1 to 41: working examples, No. 42 to 51: comparative examples). The Test Samples were each placed in a ball mill pot together with pure water and wet mixed with resin coated balls for 16 hours.

The resulting mixture was taken out of the pot, dried at 150° C. for 3 hours, and then calcined in oxygen at 1,000° C. for 2 hours. After the calcination, the mixture was ground into particles, which were passed through a sieve of 42 mesh; the particle size thereof were made uniform. The resulting powder was primarily formed into a disc with a diameter of 10 mm and a thickness of about 5 mm under a pressure of 500 kg/cm² in a mold, and the disc was pressed under a pressure of 2,000 kg/cm² using a hydrostatic press to give a pressure-formed product.

Subsequently, the formed products thus obtained for the examples were each treated in an oxygen atmosphere under conditions given in Table 2 to give dielectric ceramics. For the dielectric ceramics obtained, the composition, and the results of measurement of relative dielectric constant ($\epsilon_r$), unloaded Q (Qu) and temperature coefficient of resonant frequencies ($\tau_f$) are given in Table 2.

The measurements of the above properties were conducted as follows.

Relative Dielectric Constant and Unloaded Q

Each ceramic obtained was cut into a disc with a diameter of 5.77 mm and a thickness of 2.90 mm, on which relative dielectric constant and unloaded Q at about 13 GHz were measured according to the Dielectric Rod Resonator Method.

Temperature Coefficient of Resonant Frequencies

For each ceramic, the resonant frequency of the above disc was measured at every 10° C. over a range of from 0° to 60° C. according to the Dielectric Rod Resonator Method, and the drift of the resonant frequency at each temperature was determined. From the results, the temperature coefficient of the resonant frequency ($\tau_f$) at 20° C. was calculated.

TABLE 1

| Test sample Nos. | Amount (g) | | | | | | | | |
|---|---|---|---|---|---|---|---|---|---|
| | $BaCO_3$ | $BaF_2$ | MgO | $MgF_2$ | ZuO | CoO | NiO | $Ta_2O_5$ | $Nb_2O_5$ |
| Examples | | | | | | | | | |
| 1~11 | 30.077 | 1.2828 | — | — | 3.4599 | 0.3980 | 0.3966 | 14.154 | 5.6620 |
| 12~22 | 30.052 | 1.3054 | — | — | 3.8923 | 0.1990 | 0.1983 | 16.513 | 4.2465 |
| 23~31 | 31.521 | — | 0.0097 | 0.4511 | 1.8164 | — | 1.7451 | 13.682 | 5.945 |
| 32~36 | 30.002 | 1.3495 | — | — | 4.3248 | — | — | 21.231 | 1.4155 |

TABLE 1-continued

| Test sample Nos. | Amount (g) | | | | | | | | |
|---|---|---|---|---|---|---|---|---|---|
| | BaCO$_3$ | BaF$_2$ | MgO | MgF$_2$ | ZuO | CoO | NiO | Ta$_2$O$_5$ | Nb$_2$O$_5$ |
| 37~41 Comparative Examples | 31.521 | — | — | — | 4.3248 | — | — | 21.231 | 1.4155 |
| 42 | 31.521 | — | — | — | 3.4599 | 0.3980 | 0.3966 | 14.154 | 5.6620 |
| 43~51 | 30.077 | 1.2828 | — | — | 3.4599 | 0.3980 | 0.3966 | 14.154 | 5.6620 |

TABLE 2

| Test sample Nos. | Conditions of heat-treatments | | | | | Composition of ceramic (mol) | | |
|---|---|---|---|---|---|---|---|---|
| | First heat-treating*$^1$ | | | 2nd heat-treating*$^2$ | | (x) | (y) | |
| | Rate | Temp. | Time | Temp. | Time | Ba | Mg | Zn |
| Examples | | | | | | | | |
| 1 | 600° C./min | 1600° C. | 5 min | 1400° C. | 1 hr | 0.5000 | 0 | 0.1333 |
| 2 | " | " | " | 1400° C. | 3 hr | " | " | " |
| 3 | " | " | " | 1400° C. | 10 hr | " | " | " |
| 4 | " | " | " | 1400° C. | 25 hr | " | " | " |
| 5 | " | " | " | 1400° C. | 50 hr | " | " | " |
| 6 | 600° C./min | 1600° C. | 30 min | 1400° C. | 25 hr | " | " | " |
| 7 | 600° C./min | 1650° C. | 5 min | 1400° C. | 25 hr | " | " | " |
| 8 | 600° C./min | 1600° C. | 5 min | 1500° C. | 25 hr | " | " | " |
| 9 | 1000° C./min | 1600° C. | 5 min | 1400° C. | 3 hr | " | " | " |
| 10 | 300° C./min | 1600° C. | 5 min | 1400° C. | 25 hr | " | " | " |
| 11 | 600° C./min | 1600° C. | 5 min | 1350° C. | 25 hr | " | " | " |
| 12 | " | " | " | 1400° C. | 1 hr | 0.5000 | 0 | 0.1500 |
| 13 | " | " | " | 1400° C. | 3 hr | " | " | " |
| 14 | " | " | " | 1400° C. | 10 hr | " | " | " |
| 15 | " | " | " | 1400° C. | 25 hr | " | " | " |
| 16 | " | " | " | 1400° C. | 50 hr | " | " | " |
| 17 | 1600° C./min | 1600° C. | 5 min | 1400° C. | 25 hr | " | " | " |
| 18 | 100° C./min | 1650° C. | 30 min | 1400° C. | 25 hr | 0.5000 | 0 | 0.1500 |
| 19 | 1500° C./min | 1500° C. | 30 min | 1400° C. | 25 hr | " | " | " |
| 20 | 600° C./min | 1700° C. | 5 min | 1500° C. | 3 hr | " | " | " |
| 21 | 300° C./min | 1550° C. | 30 min | 1500° C. | 3 hr | " | " | " |
| 22 | 300° C./min | 1700° C. | 1 min | 1500° C. | 3 hr | " | " | " |
| 23 | 300° C./min | 1700° C. | 5 min | 1600° C. | 10 hr | 0.5000 | 0.0233 | 0.0700 |
| 24 | " | " | " | 1550° C. | 10 hr | " | " | " |
| 25 | " | " | " | 1500° C. | 10 hr | " | " | " |
| 26 | " | " | " | 1450° C. | 10 hr | " | " | " |
| 27 | " | " | " | 1400° C. | 10 hr | " | " | " |
| 28 | " | " | " | 1300° C. | 10 hr | " | " | " |
| 29 | " | " | " | 1200° C. | 10 hr | " | " | " |
| 30 | " | " | " | 1450° C. | 1 hr | " | " | " |
| 31 | " | " | " | 1450° C. | 10 min | " | " | " |
| 32 | 600° C./min | 1700° C. | 5 min | 1400° C. | 1 hr | 0.5 | 0 | 0.1667 |
| 33 | " | " | " | 1400° C. | 10 hr | " | " | " |
| 34 | " | " | " | 1400° C. | 25 hr | " | " | " |
| 35 | 600° C./min | 1700° C. | 5 min | 1400° C. | 50 hr | 0.5 | 0 | 0.1667 |
| 36 | " | " | " | 1400° C. | 100 hr | " | " | " |
| 37 | " | " | " | 1400° C. | 1 hr | 0.5 | 0 | 0.1667 |
| 38 | " | " | " | 1400° C. | 10 hr | " | " | " |
| 39 | " | " | " | 1400° C. | 25 hr | " | " | " |
| 40 | " | " | " | 1400° C. | 50 hr | " | " | " |
| 41 | " | " | " | 1400° C. | 100 hr | " | " | " |
| 42 | 10° C./min | 1650° C. | 4 hr | 1400° C. | 25 hr | 0.5 | 0 | 0.1333 |
| 43 | 2000° C./min | 1600° C. | 5 hr | *$^4$ | | — | — | — |
| 44 | 600° C./min | 1600° C. | 5 min | 1100° C. | 3 hr | 0.5000 | 0 | 0.1333 |
| 45 | " | " | " | 1100° C. | 25 hr | " | " | " |
| 46 | " | " | " | 1100° C. | 100 hr | " | " | " |
| 47 | 600° C./min | 1450° C. | 1 hr | 1400° C. | 25 hr | " | " | " |
| 48 | 600° C./min | 1750° C. | 5 min | 1400° C. | 25 hr | " | " | " |
| 49 | " | " | " | 1500° C. | 5 min | " | " | " |
| 50 | " | " | " | 1400° C. | 5 min | " | " | " |
| 51 | " | " | " | 1300° C. | 5 min | " | " | " |

| Test sample Nos. | Composition of ceramic (mol) | | | | | | Dielectric properties | | |
|---|---|---|---|---|---|---|---|---|---|
| | (y) | | (1 − x − y) | | (z) | (w) | | | τ$_f$ |
| | Co | Ni | Ta | Nb | F | O*$^3$ | ε$_r$ | Q$_u$ | ppm/°C. |
| Examples | | | | | | | | | |
| 1 | 0.0167 | 0.0167 | 0.2000 | 0.1333 | 0.002 | 1.4990 | 33.8 | 10900 | 5.9 |
| 2 | " | " | " | " | 0.001 | 1.4995 | 33.3 | 11400 | 5.5 |
| 3 | " | " | " | " | " | " | 32.4 | 13000 | 4.8 |
| 4 | " | " | " | " | " | " | 31.9 | 13500 | 3.7 |
| 5 | " | " | " | " | " | " | 31.3 | 13800 | 2.2 |
| 6 | " | " | " | " | " | " | 32.1 | 12800 | 3.5 |

TABLE 2-continued

| | | | | | | | | | |
|---|---|---|---|---|---|---|---|---|---|
| 7 | " | " | " | " | " | " | 31.9 | 12800 | 3.6 |
| 8 | " | " | " | " | " | " | 33.7 | 11000 | 5.8 |
| 9 | " | " | " | " | 0.002 | 1.4990 | 33.1 | 12500 | 5.4 |
| 10 | " | " | " | " | 0.001 | 1.4995 | 31.6 | 10800 | 3.8 |
| 11 | " | " | " | " | " | " | 30.9 | 12100 | 3.0 |
| 12 | 0.0083 | 0.0083 | 0.2334 | 0.1000 | 0.002 | 1.4991 | 32.8 | 10800 | 4.7 |
| 13 | " | " | " | " | 0.001 | 1.4996 | 32.6 | 11200 | 4.1 |
| 14 | " | " | " | " | " | " | 31.9 | 11700 | 3.4 |
| 15 | " | " | " | " | " | " | 31.5 | 11600 | 2.8 |
| 16 | " | " | " | " | " | " | 31.1 | 12100 | 2.0 |
| 17 | " | " | " | " | " | " | 31.0 | 10700 | 2.6 |
| 18 | 0.0083 | 0.0083 | 0.2334 | 0.1000 | 0.001 | 1.4996 | 30.6 | 10000 | 2.6 |
| 19 | " | " | " | " | " | " | 30.7 | 9900 | 2.5 |
| 20 | " | " | " | " | " | " | 32.9 | 9500 | 4.9 |
| 21 | " | " | " | " | " | " | 32.7 | 10700 | 4.5 |
| 22 | " | " | " | " | " | " | 32.5 | 11100 | 4.7 |
| 23 | — | 0.0733 | 0.1934 | 0.1400 | 0.001 | 1.4996 | 29.8 | 8000 | −1.2 |
| 24 | " | " | " | " | " | " | 29.7 | 8000 | −1.5 |
| 25 | " | " | " | " | " | " | 29.7 | 8100 | −1.9 |
| 26 | " | " | " | " | " | " | 29.5 | 9000 | −2.5 |
| 27 | " | " | " | " | " | " | 29.3 | 10600 | −2.9 |
| 28 | " | " | " | " | " | " | 29.4 | 10000 | −3.0 |
| 29 | " | " | " | " | 0.002 | 1.4991 | 29.2 | 9400 | −3.0 |
| 30 | " | " | " | " | " | " | 29.7 | 8700 | −0.9 |
| 31 | " | " | " | " | " | " | 29.7 | 8500 | −0.8 |
| 32 | 0 | 0 | 0.3000 | 0.0333 | 0.002 | 1.4990 | 30.6 | 13000 | 5.1 |
| 33 | " | " | " | " | 0.001 | 1.4995 | 30.2 | 15200 | 4.0 |
| 34 | " | " | " | " | " | " | 29.8 | 17900 | 2.7 |
| 35 | 0 | 0 | 0.3000 | 0.0333 | 0.001 | 1.4995 | 29.6 | 20500 | 1.7 |
| 36 | " | " | " | " | " | " | 29.5 | 22200 | 0.9 |
| 37 | 0 | 0 | 0.3000 | 0.0333 | 0 | 1.5000 | 30.3 | 9500 | 5.1 |
| 38 | " | " | " | " | " | " | 29.8 | 12500 | 3.8 |
| 39 | " | " | " | " | " | " | 29.4 | 14800 | 2.6 |
| 40 | " | " | " | " | " | " | 29.4 | 16000 | 1.5 |
| 41 | " | " | " | " | " | " | 29.4 | 17900 | 0.8 |
| 42 | 0.0167 | 0.0167 | 0.2000 | 0.1333 | 0 | 1.5000 | 27.7 | 6000 | 3.8 |
| 43 | — | — | — | — | — | — | — | — | — |
| 44 | 0.0167 | 0.0167 | 0.2000 | 0.1333 | 0.002 | 1.4990 | 33.7 | 10200 | 6.2 |
| 45 | " | " | " | " | " | " | 33.7 | 10700 | 6.1 |
| 46 | " | " | " | " | 0.001 | 1.4995 | 33.6 | 10500 | 6.1 |
| 47 | " | " | " | " | " | " | 26.5 | 4200 | 3.5 |
| 48 | " | " | " | " | " | " | 30.8 | 7000 | 3.8 |
| 49 | " | " | " | " | " | " | 33.2 | 10500 | 6.2 |
| 50 | " | " | " | " | " | " | 33.3 | 10600 | 6.2 |
| 51 | " | " | " | " | 0.002 | 1.4990 | 33.3 | 10200 | 6.0 |

Note:
*[1]Heating rate, temperature at which the formed product was maintained, and time for which the formed product was maintained at said temperature.
*[2]Temperature and time for firing.
*[3]The value of w (oxygen content) was calculated on the assumption that Co has the valence of +2.
*[4]The formed product cracked As is clear from Table 2, in the case of Test Sample Nos. 1 to 41, working examples of the present invention, it is possible to make the temperature coefficient ($\tau_f$) of dielectric ceramics with an identical composition to possess varied values, with the $\epsilon_r$ and Qu being highly maintained.

The dielectric ceramic obtained in Example 5 was ground and the powder obtained was subjected to X-ray diffractometry, resulting in the X-ray diffraction pattern shown in FIG. 1. In the FIGURE, the diffraction lines appended by indices are due to a hexagonal perovskite-type crystal structure. The intensities of the diffraction lines due to other crystal structures are 10/100 or less of those of the strongest diffraction lines (110) or (102) due to the perovskite-type crystal structure; hence the ceramic can be considered to substantially have a perovskite-type complex crystal structure.

It was confirmed that the dielectric ceramics produced in the other working examples also had a perovskite-type complex crystal structure.

We claim:

1. A process for preparing a dielectric ceramic consisting essentially of a compound having a perovskite-type complex crystal structure and having a composition represented by the general formula (I):

$$Ba_xA_yB_{1-x-y}O_w \quad (I)$$

wherein A represents at least one metal selected from the group consisting of Mg, Zn, Ni and Co; B represents at least one metal selected from the group consisting of Ta and Nb; x and y are numbers represented by $0.48 \leq x \leq 0.52$, and $0.15 \leq y \leq 0.19$; and w represents such a number as to neutralize the total electric charge of the cations of Ba, A and B so that said ceramic is electrically neutral as a whole, said process comprising the steps of calcining at a temperature of 900° to 1,400° C. a mixture of compounds selected from the group consisting of oxides, and compounds capable of conversion into the oxides, of the metals constituting the compound of general formula (I), and firing the resultant calcined product without hot pressing, wherein said firing step comprises:

a first heat-treating substep comprising heating the calcined product up to a temperature of 1,500° to 1,700° C. at a rate of 100° to 1,600° C./min. and thereafter maintaining the calcined product at the temperature for at least one minute, and a second subsequent heat-treating substep comprising heating the resultant product at a temperature of 1,200° C. to lower than 1,500° C. for at least 10 minutes.

2. The process according to claim 1, wherein x and y in said general formula (I) are numbers represented by $0.49 \leq x \leq 0.51$ and $0.16 \leq y \leq 0.18$.

3. The process according to claim 1, wherein in the first heat-treating substep said calcined product is heated at a rate of 300° to 1,600° C./min. up to a temperature of 1,550° to 1,650° C., and thereafter maintained at the temperature for 2 minutes to 4 hours.

4. The process according to claim 1, wherein the calcined product is heated for more than 30 minutes in the first heat-treating substep.

5. The process according to claim 1, wherein the calcined product is heated for 1 to 30 minutes in the first heat-treating substep.

6. A process for preparing a dielectric ceramic consisting essentially of a compound having a perovskite-type complex crystal structure and having a composition represented by the general formula (II):

$$Ba_xA_yB_{1-x-y}F_zO_w \qquad (II)$$

wherein A represents at least one metal selected from the group consisting of Mg, Zn, Ni and Co; B represents at least one metal selected from the group consisting of Ta and Nb; x and y are numbers represented by $0.48 \leq x \leq 0.52$, and $0.15 \leq y \leq 0.19$; z is a number represented by $0.0025 \leq z \leq 0.05$; and w represents such a number as to neutralize the total electric charge of the cations of Ba, A and B and the anions of F so that said ceramic is electrically neutral as a whole, said process comprising the steps of calcining at a temperature of 900° to 1,400° C. a mixture of compounds selected from the group consisting of oxides, fluorides and oxyfluorides, and compounds capable of conversion into the oxides, fluorides and oxyfluorides, of the metals constituting the compounds of general formula (II), and firing the resultant calcined product without hot pressing, wherein said firing step comprises:

a first heat-treating substep comprising heating the calcined product up to a temperature of 1,500° to 1,700° C. at a rate of 100° to 1,600° C./min. and thereafter maintaining the calcined product at the temperature for at least one minute, and a second subsequent heat-treating substep comprising heating the resultant product at a temperature of 1,200° to 1,600° C. for at least 10 minutes, wherein the temperature utilized in the first heat-treating substep is different than the temperature utilized in the second heat-treating substep.

7. The process according to claim 6, wherein x, y and z in said general formula (II) are numbers represented by $0.49 \leq x \leq 0.51$, $0.16 \leq y \leq 0.18$ and $0.0005 \leq z \leq 0.01$.

8. The process according to claim 6, wherein in the first heat-treating substep said calcined product is heated at a rate of 300° to 1,600° C./min. up to a temperature of 1,550° to 1,650° C., and thereafter maintained at the temperature for 2 minutes to 4 hours.

9. The process according to claim 6, wherein the calcined product is heated for more than 30 minutes in the first heat-treating substep, and the resultant product is heated at a temperature of 1,200° C. and less than 1500° C. in the second heat-treating substep.

10. The process according to claim 6, wherein the calcined product is heated for 1 to 30 minutes in the first heat-treating substep, and the resultant product is heated at a temperature of 1,200° C. to 1,600° C.

11. The process according to claim 1, wherein the second heat-treating substep comprises heating the resultant product at a temperature of 1,400° C. to less than 1,500° C.

12. The process according to claim 6, wherein the second heat-treating substep comprises heating the resultant product at a temperature of 1,200° C. to less than 1,500° C.

13. The process according to claim 6, wherein the second heat-treating substep comprises heating the resultant product at a temperature of 1,400° C. to less than 1,500° C.

* * * * *